Patented Feb. 18, 1936

2,030,964

UNITED STATES PATENT OFFICE 2,030,964

EGG PRODUCT AND EMULSIFIER THEREFOR

Forest H. Clickner, Chicago, Ill., assignor to Kraft-Phenix Cheese Corporation, Chicago, Ill., a corporation of Delaware No Drawing. Application April 16, 1934, Serial No. 720,809

5 Claims. (Cl. 99—11)

In the preparation of mayonnaise and similar emulsified products it is customary to add egg yolk as an emulsifying agent, in order to facilitate the emulsification of the oily and aqueous ingredients. In previous commercial practice it has been customary to use egg yolk alone for this purpose because of the fact that the white of egg is of no value as an emulsifier. This has usually involved the expensive operation of separating the yolks from the whites. Where said separation is not made the white is present merely as dead weight, increasing transportation charges, because the product has been sold solely on the basis of yolk value, the white being considered as merely so much additional water.

I have made the surprising discovery that whey from which the lipoid has been substantially removed, particularly whey powder, constitutes a valuable emulsifying agent, and that when such lipoid-free whey powder is added to the white of egg, a highly valuable emulsifier is obtained. When such lipoid-free whey has been added to white of egg it becomes the full equivalent of egg yolk in respect of its emulsifying power and may be used in the same way and with equal results in the manufacture of mayonnaise and other emulsified products.

As an incident of my invention, the separation of yolks from the whites of eggs is obviated and the mixed yolks and whites which have been treated according to my process may be sold on the same basis as pure yolks, instead of the whites being considered as mere diluent, as in previous practice. It is thus apparent that my invention makes possible a saving in labor of separation as well as a large increase in the value of egg material, inasmuch as the white constitutes approximately 25 per cent by weight of whole egg content.

Example

In preparing the lipoid-free whey I may start either with ordinary hygroscopic whey powder or with a non-hygroscopic whey powder produced by the process disclosed in Simmons Patent No. 1,763,633, dated June 10, 1930, or Eldredge Patent No. 1,923,427, dated August 22, 1933, or by any other suitable process. In any event, the whey powder, which should be in finely pulverulent condition, say, about 180 mesh, is extracted with a suitable fat solvent, such as isopropyl alcohol, ether, etc. Sufficient solvent is added to the whey powder to wet it and form a paste. The solvent is then removed, as by placing the material in a basket-type of centrifuge and whizzing until most of the solvent is eliminated, carrying with it the major portion of the lipoid fraction. Possibly 90 per cent of the lipoid is thus removed from the whey powder. The residual whey powder may then be placed in trays and dried at or about room temperature. The drying operation usually requires approximately an hour.

Where ordinary or hygroscopic whey powder is used as the starting material, the extraction step results in converting this material into the non-hygroscopic form, probably due to the presence of small quantities of moisture in the solvent which are taken up by the hygroscopic lactose. This conversion of the hygroscopic whey powder to the non-hygroscopic form is of considerable value because, in the latter condition, it may be kept and transported in non-air tight containers without danger of caking or lumping and, therefore, may be used with the greatest ease.

The dry material obtained as described above is crumbled to a fine powder. The result is substantially lipoid-free non-hygroscopic whey powder. This material may be used as an emulsifier for various materials and will function of itself to emulsify oil and water mixtures in which vegetable or mineral oil is present in a proportion up to approximately 80 per cent.

However, my preferred application of this product is in connection with eggs which are used commercially in the manufacture of such emulsified materials as mayonnaise. This phase of my invention will now be described.

Egg product

Whole eggs are removed from the shells and are preferably strained. Approximately 10 pounds of the lipoid-free whey powder, produced as described above, are added for each 80 pounds of whole-egg material (whites and yolks). The material is then mixed and stirred thoroughly, although it is not necessary to homogenize. Such mixing may take place at or near room temperature.

The material may then be placed in cans or other suitable receptacles and is frozen. It is preferably initially brought down to a temperature of about −10° F. After the initial freezing it may be stored at temperatures of, say, 20 to 23° F., until required for use.

The frozen whole egg product described above may be used in the manufacture of mayonnaise, after it has been thawed, in the usual manner in which egg or egg yolks are used, and it is found that my improved whole egg product will function as a highly efficient emulsifier fully equivalent to pure yolk material.

Egg whites alone may be treated by the addition of the improved whey powder and may thus be made the equivalent of egg yolk, as far as emulsifying power is concerned. However, in ordinary commercial practice, it will be more expedient to treat the whole-egg material.

The lipoid-free whey powder embodying my invention may be used as an emulsifier in oil-water systems in various other industrial applications, which will be readily apparent to those skilled in the art.

Various modifications and variations coming within the spirit of my invention will no doubt suggest themselves to those skilled in the art and, hence, I do not wish to be limited to the specific embodiments disclosed above but wish the scope of my invention to be determined by reference to the appended claims, which are to be construed as broadly as the state of the art will permit.

I claim as my invention:

1. A new composition of matter, comprising whole egg material to which has been added whey powder substantially free of lipoid.

2. A new composition of matter, comprising egg white, to which has been added sufficient whey powder substantially free of lipoid to render said egg white substantially equivalent in emulsifying power to egg yolk.

3. A method comprising adding to whole egg material sufficient whey powder substantially free of lipoid to render the white portion of said egg material substantially equivalent in emulsifying power to the yolk portion thereof.

4. A method comprising adding to whole egg material sufficient whey powder substantially free of lipoid to render the white portion of said egg material substantially equivalent in emulsifying power to the yolk portion thereof, and then freezing the material.

5. A method comprising adding to egg white sufficient whey powder substantially free of lipoid to render said egg white substantially equivalent in emulsifying power to ordinary egg yolk.

FOREST H. CLICKNER.